United States Patent
Kestner et al.

(10) Patent No.: US 7,721,275 B2
(45) Date of Patent: May 18, 2010

(54) DATA-FLOW BASED POST PASS OPTIMIZATION IN DYNAMIC COMPILERS

(75) Inventors: Daniel Kestner, Saarbruecken (DE); Mirko Luedde, Hildesheim (DE); Richard Reingruber, Heidelberg (DE); Holger Stasch, Mannheim (DE); Stephan Wilhelm, Siersburg (DE)

(73) Assignee: SAP AG, Walldorf (DE)

( * ) Notice: Subject to any disclaimer, the term of this patent is extended or adjusted under 35 U.S.C. 154(b) by 1264 days.

(21) Appl. No.: 10/845,652

(22) Filed: May 14, 2004

(65) Prior Publication Data

US 2005/0257202 A1 Nov. 17, 2005

(51) Int. Cl.
G06F 9/45 (2006.01)
(52) U.S. Cl. .................. 717/154; 717/155; 717/156; 717/157; 717/158; 717/159
(58) Field of Classification Search ............. None
See application file for complete search history.

(56) References Cited

U.S. PATENT DOCUMENTS 6,233,733 B1 * 5/2001 Ghosh ................ 717/118
2005/0198626 A1 * 9/2005 Kielstra et al. ............ 717/156

OTHER PUBLICATIONS

Jones et al., "Annotating Java class files with virtual registers for performance", Nov. 15, 1999, John Wiley & Sons, Ltd., pp. 389-406.*

Suganuma et al., "Overview of the IBM Java Just-in-Time Compiler", 2000, IBM Systems Journal, pp. 175-193.*

Bala et al., "Dynamo: A Transparent Dynamic Optimization System", 2000 ACM, pp. 1-12.*

Suganuma et al., "A Dynamic Optimization Framework for a Java Just-In-Time Compiler", 2001 ACM, pp. 180-194.*

Ishizaki et al., "Effectiveness of Cross-Platform Optimizations for a Java Just-In-Time Compiler", Oct. 26, 2003, OOPSLA '03, 2003 ACM, pp. 187-204.*

Gupta et al., "Alias Analysis for Intermediate Code", May 25, 2003, GCC Developers Summit, Ottawa, Canada, pp. 71-78.*

Fitzgerald et al., "Marmot: An Optimizing Compiler for Java", Jun. 16, 1999, Microsoft Research, pp. 1-29.*

Bruening et al., "An Infrastructure for Adaptive Dynamic Optimization", 2003 IEEE, pp. 1-11.*

* cited by examiner

Primary Examiner—Michael J Yigdall
Assistant Examiner—Ben C Wang
(74) Attorney, Agent, or Firm—Blakely, Sokoloff, Taylor & Zafman LLP

(57) ABSTRACT

A system and method to perform post pass optimizations in a dynamic compiling environment. A dynamic compiler emits machine code. Responsive to the emission of the machine code a post pass processor creates an abstract representation of the code from the dynamic compiler. Data flow analysis is then conducted on the abstract representation. Redundant instructions in the machine code are identified and eliminated as a result of the data flow analysis.

15 Claims, 4 Drawing Sheets

DATA-FLOW BASED POST PASS OPTIMIZATION IN DYNAMIC COMPILERS

BACKGROUND

1. Field of the Invention

The invention relates to dynamic compilers. More specifically, the invention relates to performing data flow analysis of dynamically compiled code through post pass processing.

2. Background

Dynamic compilers, also referred to as just in time (JIT) compilers are used in environments in which it is necessary (or desirable) to compile code at run time. The basic operation of existing dynamic compilers is to read the byte code to be compiled. Once the byte code is read, the dynamic compiler creates an internal representation (IR) of that code. The dynamic compiler may or may not then perform some optimization on the IR. The compiler then generates machine code from the potentially optimized IR. The compiler writes the machine code back to memory (emit the machine code) for immediate execution. For example, Sun Microsystems provides the CDC Hotspot implementation of a simple dynamic compiler in Java™ virtual machines (JVM). In the JVM, the dynamic compiler speeds up execution of programs within the JVM over preexisting interpretive solutions because the machine code created by the compiler (referred to interchangeably herein as "compiled code" or "machine code") executes faster than interpreting the byte code at run time. However, a simple dynamic compiler like the CDC Hotspot implementation tends to generate inefficient machine code in many contexts.

SUMMARY

A system and method for post processing dynamically compiled code. In one embodiment a post pass processor performs one or more optimizations on the dynamically compiled code. In one embodiment, an abstraction engine creates an abstract representation of the machine code from the dynamic compiler. Data flow analysis may then be conducted on the abstract representation.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
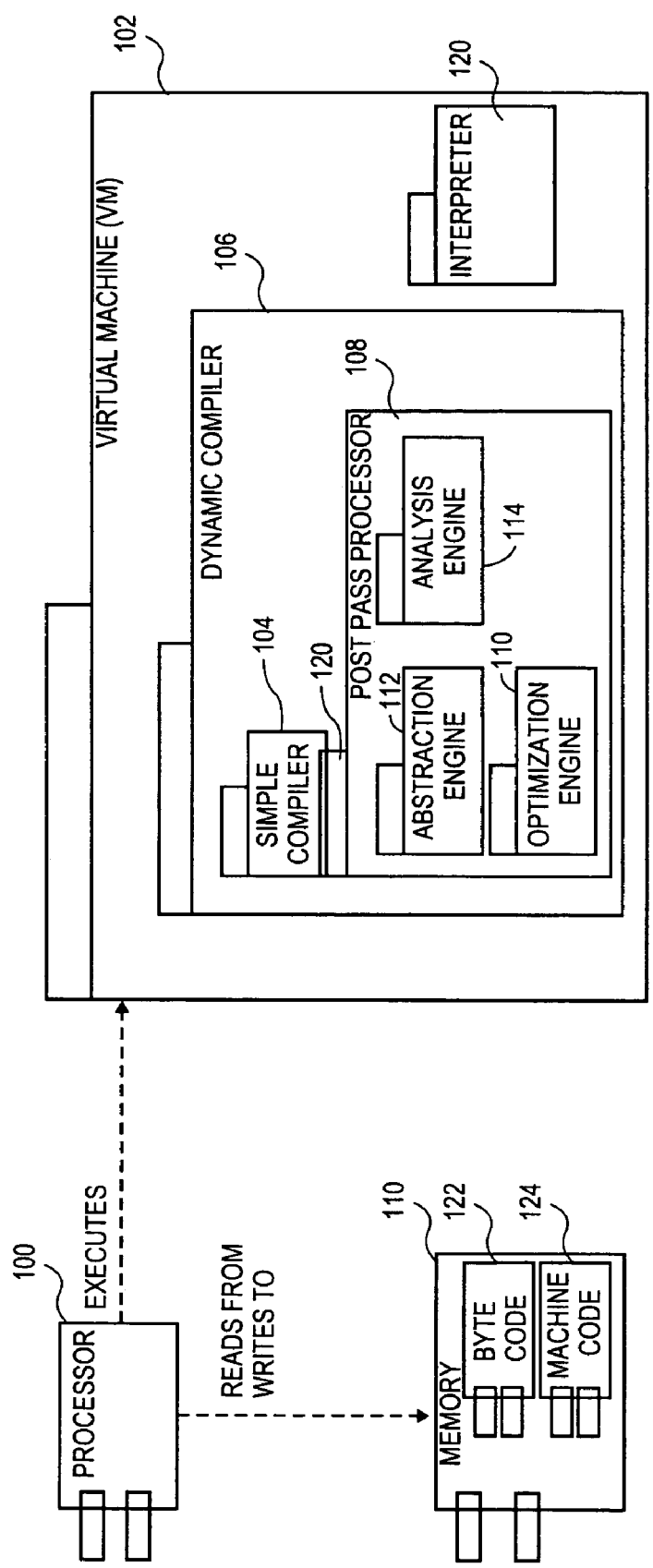
FIG. 1 is a block diagram of the system implementing one embodiment of the invention.

The embodiments of the invention improve on the performance of existing dynamic compilers without major modifications of such compilers by analyzing the code generated by the dynamic compiler and performing optimizations on the compiled code at runtime. FIG. 1 is a block diagram of the system implementing one embodiment of the invention. A processor 100 is coupled to a memory 110. In some embodiments processor 100 may be an Intel 32-bit (JA-32)™ architecture. In another embodiment, the processor may have an Advanced Micro Devices™ 64-bit (AMD 64)™ architecture, an Intel™ EM64T architecture or an Intel™ IA-64 architecture that executes IA-32 code. The foregoing implies that the processor may use an IA-32™ instruction set or an AMD-64™ instruction set respectively. In another embodiment, the processor 100 may be any processor that executes machine code generated from a Java™ compiler.

Memory 110 may encompass any type of computer storage. For example, Memory 110 could be without limitation random access memory (RAM), non volatile random access memory (NVRAM), cache memory, flash memory, and other memory devices. Memory 110 may also include one or more hard disks, floppy disks, ZIP disks, magnetic random access memory (MRAM) devices, and other system readable media that store instructions and or data. Memory 110 may store program modules such as routines, programs, objects, images, data structures, program data, and other program modules that perform particular tasks or implement particular abstract data types that facilitate system use.

Processor 100 executes a virtual machine (VM) 102. VM 102 in one embodiment may be a Java virtual machine (JVM). VM 102 contains an interpreter 120 to interpret byte code without compiling it into native code. Interpretation is generally slower than executing native code. Accordingly, dynamic compilation may speed execution where code segments are reused. A dynamic compiler 106 executes on the VM 102. The dynamic compiler 106 includes a simple compiler 104, which in one embodiment may be a CDC Hotspot Implementation of a Java just in time (JIT) compiler available from Sun Microsystems of Mountain View, Calif. The simple compiler 104 is hooked to a post pass processor 108. In one embodiment, the post pass processor (PPP) 108 includes an abstraction engine 112, a data flow analysis engine 114 and optimization engine 110. PPP 108 hooks into the simple compiler 104 at the point 120 at which the simple compiler 104 emits compiled machine code 124 into memory 110. Through this hook, PPP 108 obtains the generated machine code 124 and also obtains further compile time information from the internal representation (IR) that is generated by the simple compiler 104.

For example, when VM 102 is directed to run a program represented by byte code 122, the simple compiler 104 reads the byte code 122 from memory 110, creates an internal representation (IR), may or may not perform some optimizations. In some embodiments, byte code 122 may be Java byte code. The compiler then emits the generated machine code 124 at point 120. Emitting the machine code 124 involves writing the machine code 124 back to memory 110, typically for immediate execution. However, prior to execution, PPP 108 performs optimizations on the generated machine code 124. PPP 108 uses abstraction engine 112 to create an abstract representation of the machine code 124 that contains additional compile time information from the simple compiler's IR. As used herein, "compile time information" is deemed to include any information available within the simple compiler during compilation that is not directly available (or is only available at a higher cost) from the generated machine code. For example, such information may determine whether a machine instruction may throw an exception that is to be interpreted as a Java null pointer exception, whether a jump instruction actually returns from the compiled code, whether a certain short instruction sequence is followed by data (as opposed to machine instructions) implementing a jump table and similar information. From the abstract representation, a control-flow graph (CFG) of the machine code is generated. The data-flow analysis (DFA) engine 114 then performs a DFA on the CFG. Based on the DFA the optimization engine 116 produces an optimized version of the machine code. In one embodiment, this optimization may include removing one or more redundant instruction sites from the machine code 124 prior to execution within virtual machine 102. As used herein, "redundant instruction" broadly means an instruction within the machine code that performs no useful work when executed. Some examples of redundant instructions are discussed below.

It has been found that even relatively simple optimizations in the post pass significantly improve the efficiency of the machine code. Even accounting for the time cost of the post pass, the improved coding efficiency has been demonstrated to significantly improve system performance using certain standard measures.

Figure 2:
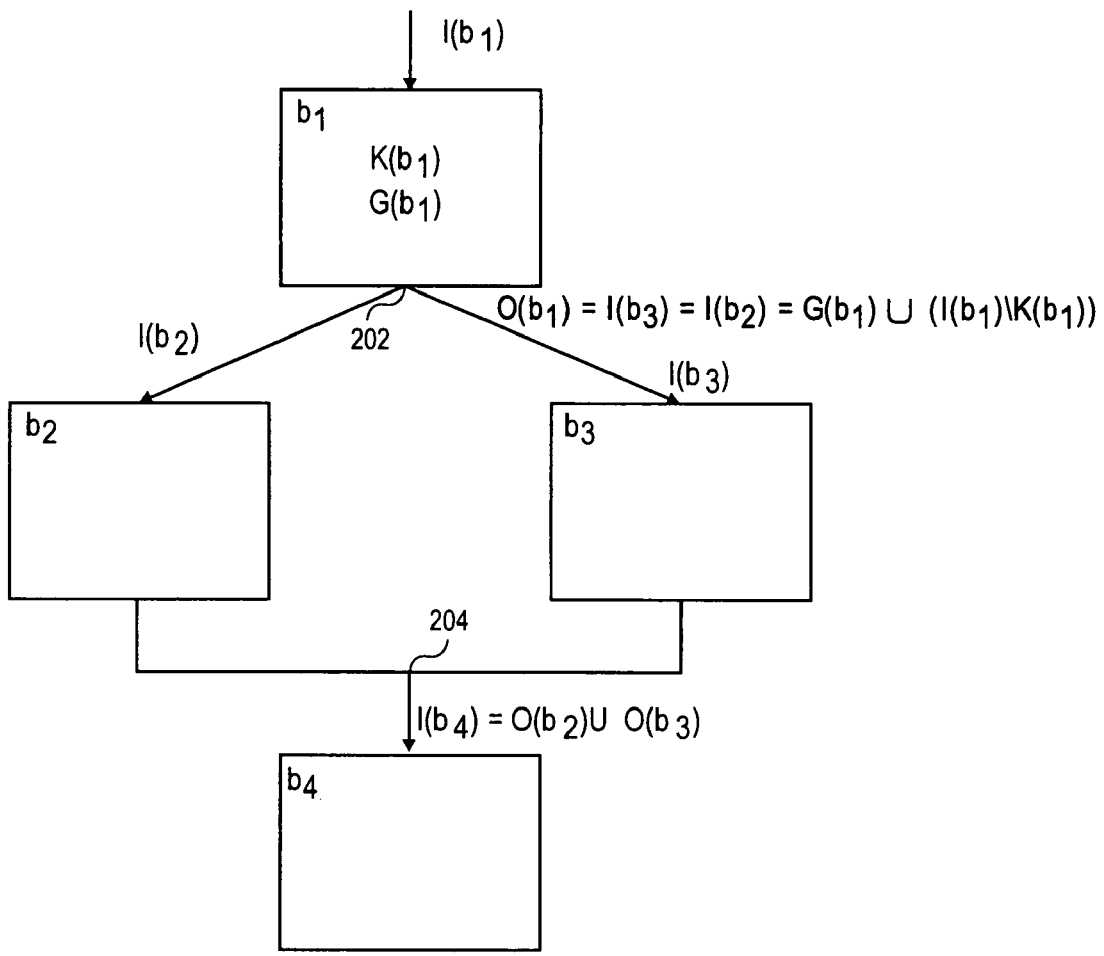
FIG. 2 is a block diagram of a portion of a control flow graph that may be generated by an abstraction engine in one embodiment of the invention.

FIG. 2 is a block diagram of a portion of a control flow graph that may be generated by an abstraction engine in one embodiment of the invention. Nodes within the CFG ($b_1$-$b_4$) correspond to basic blocks of sequences of instruction sites or to single instruction sites of the program, depending on the granularity of the DFA to be performed. As used herein, "instruction site" is one occurrence of a machine instruction in the generated code. As used herein "a basic block" is a maximal sequence of instruction sites that are necessarily executed one after another. At the limit, a basic block may be a single instruction site. As used herein, "edges" represent possible control transfers such as jumps, calls, and branches. Basic blocks are delimited by forks and joins. Joins only occur at the beginning of a basic block and forks only occur at the end of a basic block. Referring to FIG. 2, fork 202 occurs at the end of basic block $b_1$, whereas join 204 occurs at the beginning of basic block $b_4$.

In one embodiment, the abstraction engine includes procedures for computing and deleting CFGs and macros for walking over a CFG. In one embodiment, descriptors are used to abstract the CFG nodes from the underlying instruction sites. Descriptors may be collected from the IR and from the machine code during machine code generation. In one embodiment the descriptors are organized in a linked list with elements bearing the order of instruction sites that were generated by the compiler. The DFA engine performs a DFA to acquire information about the data arriving at each edge in the CFG. The DFA is performed iteratively traversing the nodes of the CFG and updating data for that information. The DFA ends once it reaches a fixed point.

A DFA is defined by sets of data flow information that are associated with the nodes b of the CFG.

1. The incoming set I(b) is the information valid immediately before the first instruction site of b.

2. The killed set K(b) is the information destroyed in b. This may include information that was created by b itself.

3. The generated set G(b) is the information that is newly generated in b and that is still valid immediately after the last instruction site of b.

4. The outgoing set O(b) is the information valid immediately after the last instruction site of b.

These sets obey the relations $$K(b) \subseteq \overline{G}(b) \qquad (1)$$

$$I(b) = \cup(\{O(p) | p \text{ precedes } b\}),$$

$$O(b) = G(b) \cup (I(b) \backslash K(b))$$

Where e.g., "$\overline{G}$" denotes the set complement of G and "\" means "without". Thus, the outgoing set is the union of the generated set and the incoming set without the killed set. During the traversal through the CFG, these equations are evaluated iteratively until the incoming and outgoing sets do not change anymore. This is what is meant by the DFA reaching a fixed point as stated above.

For use in the DFA discussion below with reference to FIG. 3, we note that by taking the complement of the relations (1) and by defining $$I':=\overline{I}$$

$$O':=\overline{O},$$

$$G':=K,$$

$$K':=G,$$

we obtain the dual data flow relations $$K'(b) \subseteq \overline{G'}(b), \qquad (2)$$

$$I'(b) = \cap(\{O'(p) | p \text{ precedes } b\}),$$

$$O'(b) = G'(b) \cup (I'(b) \backslash K'(b)).$$

Depending on the type of DFA performed, any one of the two relations (1) and (2) may become applied. The DFA uses the CFG to compute G(b), K(b), and O(b) for every basic block b.

Figure 3:
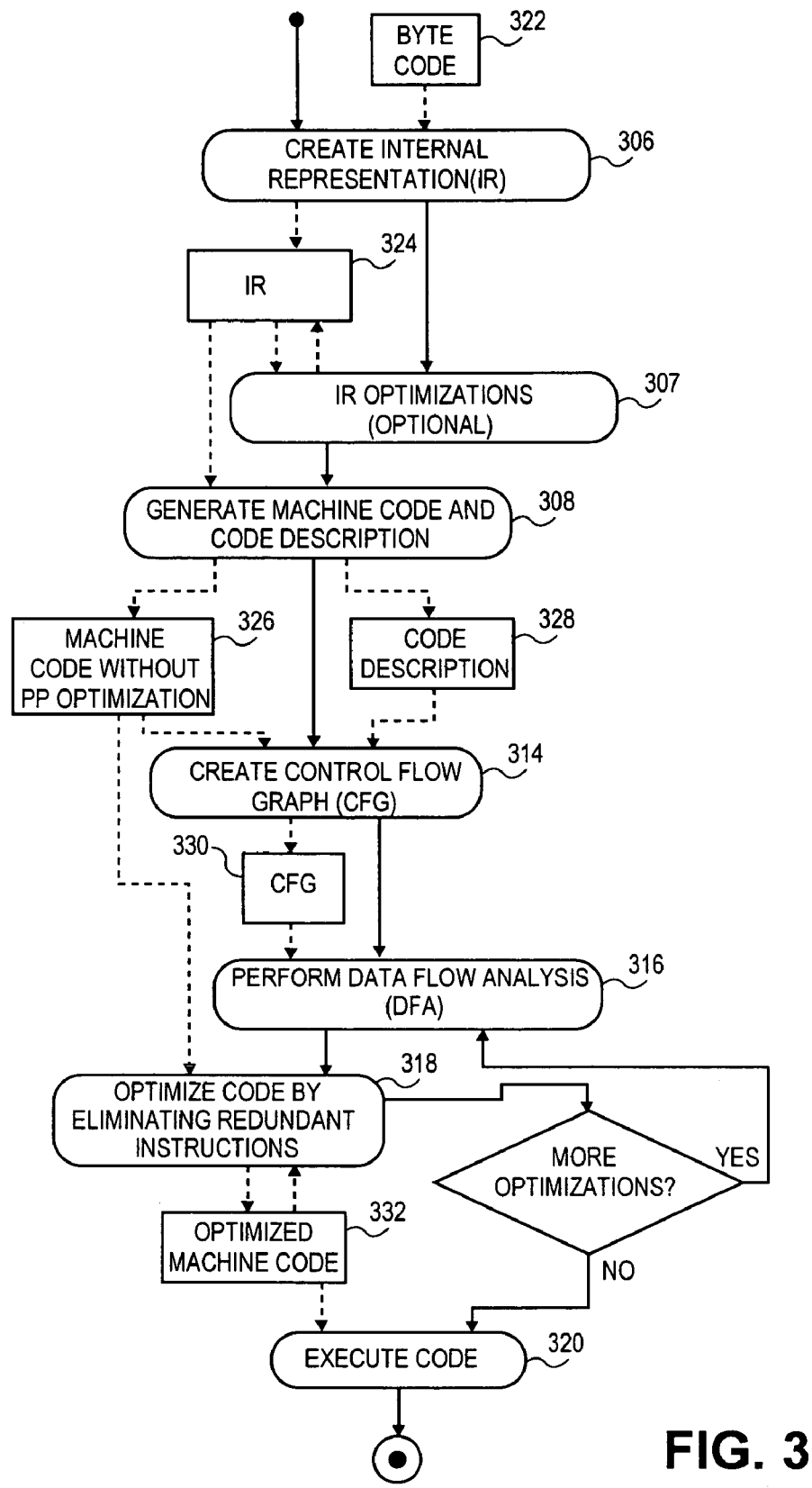
FIG. 3 is an activity object diagram of operation in the compiler of one embodiment of the invention.

FIG. 3 is an activity/object diagram of operation in the compiler of one embodiment of the invention. Once program compilation is requested, the compiler reads the byte code 322 from memory. Activity 306 creates an internal representation (IR). The IR may be a tree or graph like representation of the sequential byte code stream. Optimizations may be performed on the IR by IR optimization activity 307. Activity 307 is optional and omitted (or only partially performed) by simple compilers. Activity 308 generates machine code 326 that is semantically equivalent to the byte code 322. Activity 308 also generates a code description 328. In one embodiment, code description 328 includes an entry for every instruction site of the machine code 326. The code description may contain the higher-level compile time information as described above. The generated machine code 326 is written back to memory which triggers the post pass processor to perform activity 314, creating the CFG from the machine code 326 and code description 328.

Figure 3A:
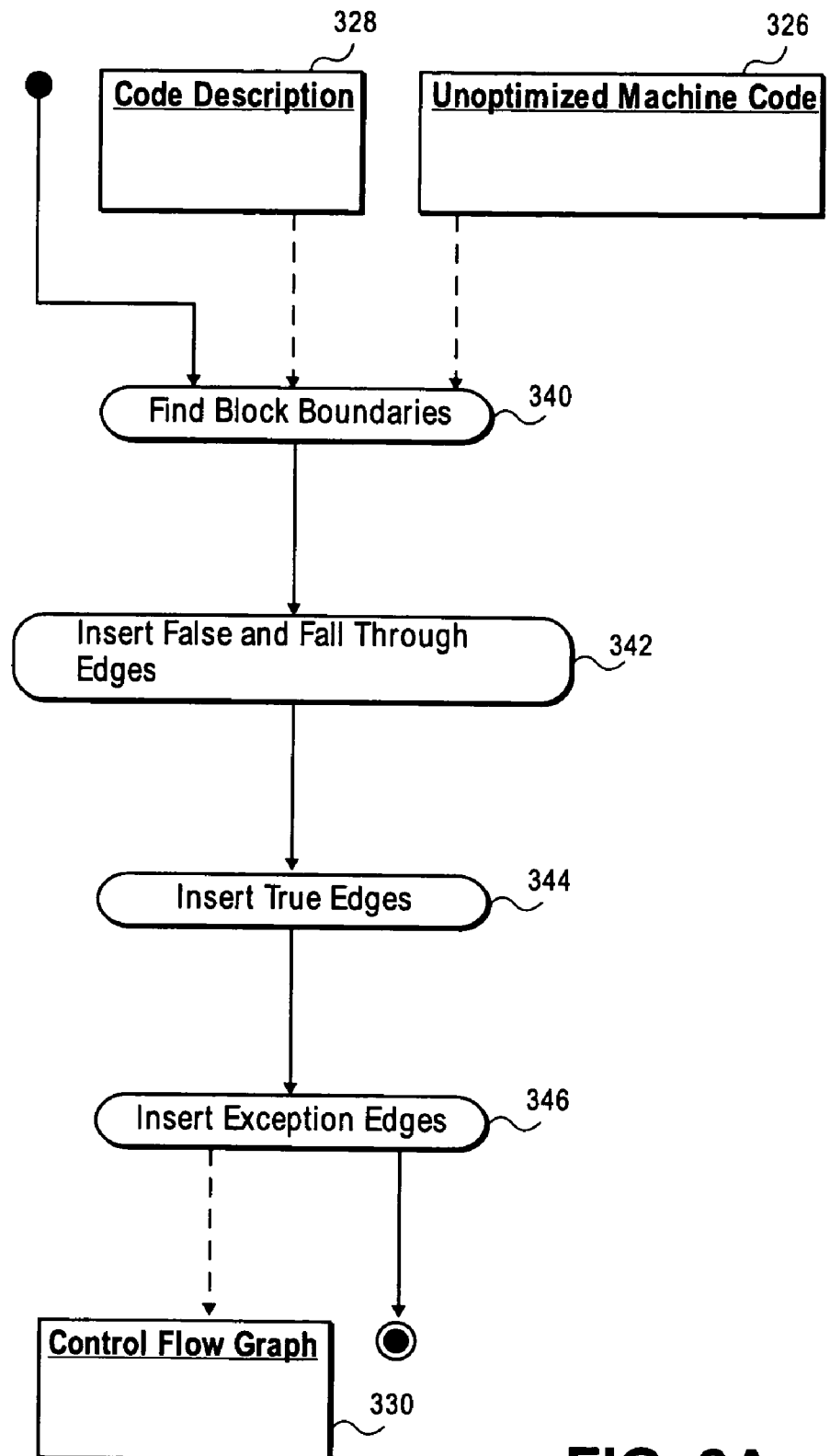
FIG. 3A is an activity object diagram of creation of control flow graph as the abstract representation in one embodiment of the invention.

FIG. 3A is an activity object diagram of creation of a control flow graph in one embodiment of invention. In the "find block boundaries" activity 340 abstraction engine identifies all entry and exit points for the basic blocks within the machine code. Exits of basic blocks are denoted by branch, jump, and call sites. As part of the identification, these sites and their corresponding targets are marked. This defines a preliminary set of basic blocks. Unless the set of target addresses for any given branch is known exactly, an edge to all other instruction sites must be inserted. In some cases it is difficult or impossible to identify the set of possible target addresses from the generated machine code alone. Accordingly, the code description 328 facilitates the identification of possible target addresses. For example, at compile time the compiler knows all the entries of a jump table when it generates a computed branch of the jump to any of the table's entries. In one embodiment this information is retained in the descriptor of the computed branch.

In activity 342, the abstraction engine inserts "false" and "fall through" edges into the CFG. As used herein, a "false edge" is defined as an edge that connects a branch site with another site that will be executed if the branch is not taken. A "fall-through edge" is defined as an edge connecting an instruction site with a second site that is the target of at least another edge.

In activity 344 the abstraction engine inserts "true edges" into the control flow graph. As used herein a "true edge" is defined as a flow of taken branches, jumps or calls.

Some embodiments of the invention may be employed in environments in which null pointer exceptions thrown from the compiled code generate a call to an exception handler. In such an embodiment an exception handler table identifies the range of addresses for which a null pointer exception handler is responsible. This additional compile time information along with whether an instruction within the range can actually throw a null pointer exception is collected and maintained in the instruction site descriptor. For every instruction site, a determination is made at activity 346 whether the site can throw a null pointer exception. If this is the case the preliminary basic block is broken up at that instruction site, an edge to the exception handler and an edge to the newly created block are inserted. Now the CFG is complete.

Returning to FIG. 3, after creation of the CFG 330 by activity 314 DFA is performed on the CFG by activity 316. Various types of DFA facilitate different optimizations. Some embodiments of invention perform a DFA to eliminate redundant sites of "free floating point register" instructions (ffree), to eliminate redundant sites of "load floating point control word" instructions (fldcw), or to eliminate unnecessary class initializations. All or any subset of these DFA's may be performed. Performance of other optimizations based on DFA are also within the contemplation of the embodiments of the invention. A discussion of how each of these redundant instruction sites arise and the appropriate DFA follows the description of FIG. 3. Activity 318 eliminates redundant instructions from the compiled code. Activity 318 rewrites machine code 326 in a more efficient form 332. Optimized machine code 332 has a shorter code length and shorter run time as compared to code 326. The DFA activity 316 and the optimize code activity 318 may be performed multiple times depending on the number of optimizations to be performed. Once the last optimization is performed, the optimized machine code 332 may be executed by the processor at activity 320.

Examples of three possible optimizations and the origin of the problem solved by each are discussed below. The first two optimizations, elimination of redundant ffree sites and elimination of redundant fldcw sites are applicable to Intel IA-32 architecture and its descendants such as AMD-64 and Intel EM64T as well as IA-64 executing legacy IA-32 programs. These optimizations are independent of the initial byte code language rather being driven by the hardware architecture. The third optimization, removal of redundant class initialization, is driven by the byte code language and independent of the underlying hardware architecture. This optimization is applicable to any object oriented programming language supporting initialization of class variables in the manner Java does.

EXAMPLE 1

Elimination of ffree Sites

Inefficiency Identified:

Redundant ffree sites may arise at exit points because the receiving procedure expects all floating point registers to be free when control is passed. In certain environments the floating point (FP) unit may not be aware that a register is free without an explicit freeing. For example, the IA-32 FP unit keeps track of whether an FP register is empty or whether it contains a value. Loading a value from memory into an FP register that is occupied leads to an FP exception.

In some embodiments, a register manager (RM) of the VM also does bookkeeping about occupied and free registers. These two bookkeepings need not be synchronous. The RM regards a register f as free as soon as there will not be any read operation on f before the next write operation into f. Therefore the RM might regard f as free and might want to reuse it, while the FP unit still regards f as occupied, not knowing that f is dead.

Nevertheless, this mismatch does not cause a problem as long as the usage of the FP registers remains under control of the RM. This results from the particular way access to FP registers must be implemented on IA-32, if the FP registers are to be regarded as a set of randomly accessible registers. Assume the RM wants to load a value from a memory location m into some FP register f. It first pushes m into a special FP register T, the top of stack register. Then it pops the value from T into f. For FP unit to allow these two successive operations, it is sufficient that T is free before m is pushed into T. Popping the value from T into f succeeds even if f is occupied. This is because T is not a memory location. The FP unit considers T as free again after the pop operation. Store operations proceed in the same way backwards.

However, a problem occurs at exit sites of the generated code. If generated code is to be left e.g., by a call to an external procedure p, p expects all FP registers to be free. While emitting the call site, the code selector in a simple compiler has no data flow information. So while it might know, which registers are free in the view of the RM, it does not know, which FP registers are free in the view of the FP unit. This means that all FP registers must conservatively be freed by ffree instruction sites before each exit point of a procedure, which usually leads to redundant ffree sites.

Data Flow Analysis for ffree

To address this issue the following data flow analysis applies. Let b range over the basic blocks. Let f range over the FP registers. The DFA is defined by relation (1) above and $$G(b):=\{f | f \text{ is written to but not freed afterwards in b}\},$$

$$K(b):=\{f | f \text{ is freed in b}\}.$$

Write accesses to FP registers are performed by instructions like fld, fild and also by binary instructions like fadd and similar instructions. Freeing an FP register can proceed by an explicit ffree instruction but can also be implicit to instructions like fstp, faddp and similar instructions.

The relations f is (not) freed in b used in the definitions of G and K must be understood as disregarding the explicit ffree sites conservatively introduced before the exit sites of the CFG. These conservative sites should not contribute to the analysis of the data flow.

Now let s range over these conservative ffree sites preceding the exit sites. Let $b_s$ be the block containing s. Let $f_s$ be the FP register freed by s. Define the redundant set $$R:=\{s | f_s \notin O(b_s)\}.$$

Then every s∈R is superfluous and may be removed.

EXAMPLE 2

Elimination of fldcw Sites

Inefficiency Identified:

In some environments redundant "load floating point control word"(fldcw) instructions may exist in the general machine code. For example, on IA-32 the behavior of FP instructions depends on the FP control register (CR). For purposes of this discussion, the CR includes two fields.

The precision field determines the precision of FP operations. It is used by the instructions fadd, faddp, fsub, fsubr, fsubp, fsubrp, fmul, fmulp, fdiv, fdivr, fdivp, fdivrp, fsqrt, fnstcw, fnsave.

The rounding field determines the rounding mode when converting between different numerical data types. It is used by the instructions fist, fistp, fst, fstp.

If the CFG is intra-procedural (as opposed to inter-procedural, where, in principle, a similar framework also applies to inter-procedural analyses), exit sites also have to be regarded as using the CR. Exit sites of a procedure can include call, ret and also jmp instructions.

An fldcw instruction need not change both CR fields, the precision field and the rounding field. Similarly, the FP instructions using the CR need not use both fields of the CR.

The prolog of a compiled procedure initializes the CR with a default value, which is double precision and round-to-nearest mode. If an FP operation requires a different setting, the CR is set accordingly immediately before the operation. Immediately afterwards the default value is restored. This can lead to redundant fldcw sites.

As an example, consider two successive fadd operations with single precision and round-to-nearest. After the first fadd site, the CR is reset to default by an fldcw site. Immediately afterwards, another fldcw is issued, setting single precision again.

The fldcw site after the first fadd site writes into the CR, but no instruction actually reads this setting. Therefore this fldcw site is redundant.

If we remove this fldcw site, the successive fldcw writes the same value, namely single precision mode, into the CR that is already contained there. Thus, the second fldcw site becomes redundant.

Data Flow Analysis for fldcw

To remove redundant fldcw instruction sites, two optimizations based on DFA's are performed. Let s be an instruction site. Both DFAs are defined by relation (1) above and $$G(s) := \begin{cases} \{s\}, & \text{if } s \text{ is an } \mathit{fldcw} \text{ site,} \\ \emptyset, & \text{otherwise,} \end{cases}$$

$$K(s) := \begin{cases} I\{s\}, & \text{if } s \text{ is an } \mathit{fldcw} \text{ site,} \\ \emptyset, & \text{otherwise,} \end{cases}$$

This implies $$O(s) := \begin{cases} \{s\}, & \text{if } s \text{ is an } \mathit{fldcw} \text{ site,} \\ I(s), & \text{otherwise,} \end{cases}$$

The first optimization removes the unused fldcw sites from a compiled procedure. Let u range over the use sites of the CR. Let f range over the fldcw sites. The incoming set at u is the set of fldcw sites that reach u, $$I(u) = \{f | f \text{ reaches } u\}.$$

Define the redundant set $$R := \{f | \text{ for every } u \text{ holds } f \notin I(u)\}.$$

Then every f∈R is unused.

Removing an unused site f from the code updates the relevant sets as $$I(u) \mapsto I'(u) = I(u)$$

$$R \mapsto R' = R \setminus \{f\}$$

In this way the information can be updated easily while the sites in R are removed iteratively. The set {b| there is an f∈R located in b} of changed blocks b is recorded to speed up the second DFA.

By regarding exit sites as uses of the CR, its initial setting from the procedure's entry points is preserved by the optimization. At each exit point the CR retains its default value.

FP store instructions like fst read the rounding field but not the precision field of the CR. Most fldcw sites change the precision field but not the rounding field. As a further optimization, it is possible only regard an fst site s as a use site for an f∈I(s), if there exists a path reaching s and containing an fldcw site that sets a non-default rounding mode. Otherwise, the default rounding mode must be set when reaching s and s is not affected by f. In this way more fldcw sites may be removed than otherwise possible.

The second optimization removes those fldcw sites from the compiled procedure that do duplicate work. The DFA is defined as in the previous case, but it now operates on the code resulting from the previous optimization. Again, the incoming set at an fldcw site f is $$I(f) = \{g | g \text{ reaches } f\}.$$

Given sites f, g that write the same value into CR, these sites are equivalent and denoted f~g. Now we define our redundant set as $$R := \{f | \text{ for every } g \in I(f) \text{ holds } f \sim g\}.$$

Then every f∈R duplicates the work of all the sites in its incoming set.

Removing an f∈R from the procedure leads to the transformation $$I(g) \mapsto I'(g) = \begin{cases} (I(g) \setminus \{f\}) \cup I(f), & \text{if } f \in I(g), \\ I(g), & \text{otherwise,} \end{cases}$$

$$R \mapsto R' = R \setminus \{f\},$$

where g≠f. Again, the redundant set may be removed.

EXAMPLE 3

Elimination of Redundant Class Initialization

Inefficiency Identified:

Redundant class initialization may occur on a wide array of possible platforms. Basically, any platform compiling Java code dynamically is likely to have redundant class initializations. Before a Java class c can be used for the first time, either by accessing a static member or by instantiating it, c has to be initialized. But c must not be initialized if no access actually occurs and c may only be initialized once. This prohibits eager class initialization. When the dynamic compiler generates code for accessing c, two cases may occur.

c is already initialized. This can happen because execution time and compilation time are interleaved. Then the dynamic compiler directly emits the access to c.

c is not yet initialized. However, it may be so later at runtime of the generated code. Hence the dynamic compiler generates code that conditionally ensures the initialization of c before it emits the access to c.

This can lead to checks of class initialization that are redundant already statically.

Data Flow Analysis for Class Initializations

To remove the redundant class initialization the following DFA may be used. Let s range over the instruction sites. Let c range over the Java classes. Now the DFA is defined by the dual DFA relations (2) and $$K'(s):=\emptyset,$$

$$G'(s):=\{c | s \text{ ensures initialization of } c\}.$$

The redundant set is $$R:=\{s | G'(s) \subseteq I'(s)\}.$$

Then s∈R means, s's work has already been performed by all of its predecessors.

An embodiment of the invention makes use of the fact that ensuring class initialization is implemented by a call. Since a basic block is ended by a call, every basic block contains at most a single class initialization check.

The foregoing three examples of optimization may all or individually be performed in a post pass on any compiled code emitted from the compiler as described above. In some embodiments, all three optimizations are performed iteratively. While three examples are given other optimizations are within the contemplated embodiments of the invention.

Elements of various embodiments of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
a platform including a processor and a memory;
a dynamic compiler to execute on the platform, and based on a byte code input, to generate an internal representation, and emit a first compiled machine code to the memory for execution by the processor; and
a post pass processor (PPP) to obtain the first compiled machine code and to obtain compile time information from the internal representation and, prior to the processor's execution of the first compiled machine code, perform an optimization on the first compiled machine code without interpreting the first compiled machine code, and to rewrite the first compiled machine code as an optimized compiled machine code to the memory for execution by the processor; wherein the PPP comprises:
an abstraction engine to create a control flow graph of the first compiled machine code enriched with the compile time information;
a data flow analysis engine to perform data flow analysis on the control flow graph, wherein the data flow analysis comprises iteratively traversing nodes of the control flow graph and at each node, updating information about the data arriving at a control transfer associated with the each node traversed, and evaluating a relationship between a generated set, an incoming set and a killed set until incoming and outgoing sets do not change; and
an optimization engine to remove redundant instructions from the first compiled machine code based on the data flow analysis performed on the control flow graph.

2. The apparatus of claim 1, wherein the redundant instructions removed from the first compiled machine code based on the data flow analysis comprise free floating point register instructions.

3. The apparatus of claim 1, wherein the control flow graph is created based on instruction site descriptors collected from at least one of the internal representation or the first compiled machine code generated by the dynamic compiler.

4. The apparatus of claim 1, wherein:
the data flow analysis engine computes the killed set, the generated set and the outgoing set for each basic block reflected in the control flow graph; and wherein
the killed set comprises information destroyed in a node of the control flow graph, the generated set comprises information that is newly generated in the node and that is still valid immediately after a last instruction site of the node, and the outgoing set comprises information valid immediately after the last instruction site of the node.

5. The apparatus of claim 1, wherein the PPP further comprises a hook into the dynamic compiler to identify when the first compiled machine code is written to the memory, to obtain the first compiled machine code emitted from compiler, and to obtain the compile time information from the internal representation.

6. The apparatus of claim 1, wherein the first compiled machine code is emitted from a simple compiler which does not perform any optimization on the internal representation.

7. The apparatus of claim 1, wherein the first compiled machine code is emitted from a simple compiler which does not perform an optimization on the internal representation based on a data flow analysis.

8. A method comprising:
generating a first compiled machine code at run time from a byte code input, with a dynamic compiler executing on a platform including a processor and a memory;
emitting the first compiled machine code to the memory;
obtaining the first compiled machine code;
obtaining compile time information from an internal representation generated by the dynamic compiler during compilation of the first compiled machine code;

analyzing the first compiled machine code in a pass subsequent to compilation, but prior to the processor's execution of the first compiled machine code, wherein the analyzing the first compiled machine code comprises:
generating a control flow graph for the first compiled machine code based on instruction site descriptors collected from the internal representation; and
performing data flow analysis on the control flow graph, wherein the data flow analysis includes iteratively traversing nodes of the control flow graph and at each node, updating information about the data arriving at a control transfer associated with the each node traversed, and evaluating a relationship between a generated set, an incoming set and a killed set until incoming and outgoing sets do not change;
performing an optimization on the first compiled machine code based on the data flow analysis performed on the control flow graph, wherein the optimization is to remove at least one redundant instruction at run time without interpreting the first compiled machine code; and
rewriting the first compiled machine code, as an optimized machine code, to the memory.

9. The method of claim 8, wherein the at least one redundant instruction is at least one of:
a free floating point register instruction;
a load floating point control word instruction; or
a sequence of one or more instructions to perform class initialization.

10. The method of claim 8, wherein analyzing the compiled code further comprises:
computing the generated set, the killed set and the outgoing set for each basic block of the first compiled machine code, wherein the killed set comprises information destroyed in a node of the control flow graph, the generated set comprises information that is newly generated in the node and that is still valid immediately after a last instruction site of the node, and wherein the outgoing set comprises information valid immediately after the last instruction site of the node.

11. The method of claim 8, wherein the instruction site descriptor comprises information associated with an exception handler table.

12. The method of claim 8, wherein the descriptor is organized as an element of a linked list bearing the order of instruction sites generated by the compiler.

13. The method of claim 8, wherein the generated set comprises information that is newly generated in the node and that is still valid immediately after a last instruction site of node, wherein the incoming set comprises information valid immediately before a first instruction of the a node, the killed set comprises information destroyed in the node, and wherein the outgoing set comprises information valid immediately after the last instruction site of the node.

14. A computer readable storage media containing executable computer program instructions which when executed cause a digital processing system to perform a method comprising:
generating a first compiled machine code at run time from a byte code input, with a dynamic compiler;
emitting the first compiled machine code to a memory of the digital processing system;
obtaining compile time information from an internal representation generated by the dynamic compiler during compilation of the first compiled machine code;
analyzing the first compiled machine code in a pass subsequent to compilation, but prior to an execution of the first compiled machine code, wherein the analyzing the compiled code comprises:
generating a control flow graph for the first compiled machine code based on instruction site descriptors collected from the internal representation, and
performing data flow analysis on the control flow graph, wherein the data flow analysis comprises iteratively traversing nodes of the control flow graph and at each node, updating information about the data arriving at a control transfer associated with the each node traversed, and evaluating a relationship between a generated set, an incoming set and a killed set until incoming and outgoing sets do not change;
performing an optimization on the first compiled machine code based on the data flow analysis performed on the control flow graph, the optimization to remove at least one redundant instruction at run time without interpreting the first compiled machine code; and rewriting the first compiled machine code, as an optimized machine code into the memory of the digital processing system.

15. An apparatus comprising:
a platform including a processor and a memory;
means for compiling code at runtime based on a byte code input and for emitting a first compiled machine code to the memory for execution by the processor;
means for obtaining the first compiled machine code and for obtaining compile time information from an internal representation generated during compilation of the first compiled machine code;
means for analyzing the first compiled machine code at runtime after compilation, but prior to the processor's execution of the first compiled machine code, wherein the means for analyzing comprises means for generating a control flow graph for the first compiled machine code based on instruction site descriptors collected from the internal representation and means for performing data flow analysis on the control flow graph, wherein the data flow analysis comprises iteratively traversing nodes of the control flow graph and at each node, updating information about the data arriving at a control transfer associated with the each node traversed, and evaluating a relationship between a generated set, an incoming set and a killed set until incoming and outgoing sets do not change;
means for optimizing the first compiled machine code based on the data flow analysis performed on the control flow graph to remove at least one redundant instruction at runtime without interpreting the first compiled machine code; and
means for rewriting the first compiled machine code as an optimized machine code to the memory.

* * * * *